(12) United States Patent  
Miyamoto et al.

(10) Patent No.: US 6,215,216 B1  
(45) Date of Patent: Apr. 10, 2001

(54) VEHICLE ALTERNATOR

(75) Inventors: Keiichi Miyamoto; Tsuneji Goda; Katsumi Adachi, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/446,987

(22) PCT Filed: Jul. 2, 1997

(86) PCT No.: PCT/JP97/02291  
§ 371 Date: Dec. 30, 1999  
§ 102(e) Date: Dec. 30, 1999

(87) PCT Pub. No.: WO99/01921  
PCT Pub. Date: Jan. 14, 1999

(51) Int. Cl.[7] .................................................. H02K 5/00
(52) U.S. Cl. ........................................ 310/89; 74/6
(58) Field of Search .......................... 310/89, 88; 74/6, 74/7 R; 29/596; 290/48

(56) References Cited

U.S. PATENT DOCUMENTS

| | | | |
|---|---|---|---|
| 4,491,754 | 1/1985 | Gotoh | 310/88 |
| 4,808,871 | * 2/1989 | Morishita et al. | 310/89 |
| 4,978,975 | * 12/1990 | Saito | 347/259 |
| 4,994,699 | * 2/1991 | Shiina | 310/88 |
| 5,010,265 | * 4/1991 | Tanaka et al. | 310/88 |
| 5,053,633 | * 10/1991 | Sugiyama et al. | 290/48 |
| 5,077,503 | * 12/1991 | Tamura et al. | 310/88 |
| 5,336,954 | * 8/1994 | Shiroyama | 310/88 |
| 5,414,315 | * 5/1995 | Mineyama et al. | 310/88 |
| 5,592,038 | * 1/1997 | Gaspar et al. | 310/71 |

FOREIGN PATENT DOCUMENTS

| | | |
|---|---|---|
| 48-83306 | 10/1973 | (JP) . |
| 55-7330 | 1/1980 | (JP) . |
| 57-6375 | 1/1982 | (JP) . |
| 57-143866 | 9/1982 | (JP) . |
| 59-134897 | 8/1984 | (JP) . |
| 8-304 | 2/1996 | (JP) . |

* cited by examiner

Primary Examiner—Nestor Ramirez  
Assistant Examiner—Joseph Waks  
(74) Attorney, Agent, or Firm—Sughrue, Mion, Zinn, Macpeak & Seas, PLLC

(57) ABSTRACT

A vehicle alternator capable of promptly discharging water coming into the interior thereof from a water discharge hole.

The vehicle alternator includes a rear bracket which supports a rotary shaft driven by an engine at the rear end thereof, has a plurality of vent holes disposed thereto and is mounted so that the main surface of the rear bracket faces in a vertical direction and the rear bracket includes a water discharge hole bored in a wall surface facing to the ground and a pair of guide portions continuously extending from the opening of the water discharge hole toward the ground in confrontation with each other.

2 Claims, 8 Drawing Sheets

VEHICLE ALTERNATOR

TECHNICAL FIELD

The present invention relates to a vehicle alternator having a water discharge structure capable of promptly discharging water coming into the alternator.

BACKGROUND ART

A vehicle alternator mounted to the engine of a vehicle is often splashed with water and in particular with muddy water when it is actually used. On the other hand, a vent hole is disposed to the rear bracket as the casing of the alternator to radiate the heat generated by the generation of power. It is preferable that the vent hole is made as large as possible to improve a heat radiating property. Since, however, the vent hole cannot be made large from the view point of the role of the rear bracket for protecting the components accommodated therein and the necessity for securing the strength of the rear bracket itself, a plurality of the vent holes each having a proper size are disposed. Such being the case, in the conventional alternator, since water such as muddy water and the like is liable to come into it through the vent holes, the alternator is provided with a water discharge hole disposed to the lower side of the rear bracket to thereby effectively discharge water coming into it.

FIG. 7 is a front elevational view of a rear bracket applied to a conventional alternator.

In FIG. 7, the rear bracket 1 of the alternator has a plurality of vent holes 1a each having a proper size and disposed thereto. A water discharge hole 1b is disposed to the lower side of the rear bracket 1. The water discharge hole 1b is formed by cutting out the wall surface of the terminal mounting portion 1c of the rear bracket 1 as shown in FIG. 8.

As shown in FIG. 9, the rear bracket 1 is disposed coaxially with a stator core 2 and journals a rotary shaft 3 driven by an engine 11 at the rear end thereof. A rectifier 4 is mounted to the terminal mounting portion 1c of the rear bracket 1.

As shown in FIG. 11, the alternator 10 arranged as described above is mounted to the engine 11 so that the main surface of the rear bracket 1 faces in a vertical direction. The terminal mounting portion 1c is located on a lower side (ground side) and the opening of the water discharge hole 1b faces downward.

When the alternator 10 is splashed with water 5 such as muddy water and the like, the water 5 comes into the alternator 10 from the vent holes 1a. The water 5 having come into the alternator 10 flows along the inside wall surface of the rear bracket 1 and is discharged from the water discharge hole 1b to the outside.

In, for example, the terminal mounting portion 1c to which the rectifier 4 is mounted, the interval between the inside wall surface of the rear bracket 1 and the rectifier 4 is narrowed. Thus, when the water 5 comes into the terminal mounting portion 1c arranged as described above, the water 5 is deposited on the rectifier 4 by surface tension as shown in FIG. 10 and difficult to be discharged from the water discharge hole 1b. When the water 5 contains many types of impurities such as mud and the like, they are dried without being discharged from the water discharge hole 1b and clog the water discharge hole 1b by the repetition of the above process. When the water discharge hole 1b is clogged, since the water 5 having come into the alternator 10 stays there without being discharged, there is a problem that the water makes the components accommodated in the rear bracket 1 such as the rectifier 4 and the like to an unacceptable state and causes a voltage drop by the contact of the rear bracket 1 serving as the ground with the components, whereby a breakdown is arisen.

DISCLOSURE OF THE INVENTION

An object of the present invention for solving the above problem is to provide an alternator having a water discharge structure capable of discharging water including impurities such as mud even if the water comes into the alternator and preventing the breakdown thereof which is caused by that the impurities clog a water discharge hole and the water stays in the alternator.

The vehicle alternator of the present invention includes a rear bracket which supports a rotary shaft driven by an engine at the rear end thereof, has a plurality of vent holes disposed thereto and is mounted so that the main surface of the rear bracket faces in a vertical direction and the rear bracket includes a water discharge hole bored in a wall surface facing to the ground and a pair of plate-like guide portions continuously extending from the opening of the water discharge hole toward the ground in confrontation with each other so as to enlarge a gap between the guide portions. The relationship between the width of the opening A of the water discharge hole and the extending length B of the guide portions is set to $B \geq 2A$.

BEST MODE FOR CARRYING OUT THE INVENTION

Preferred embodiments of the present invention will be described below with reference to the drawings.

Embodiment 1

Figure 1:
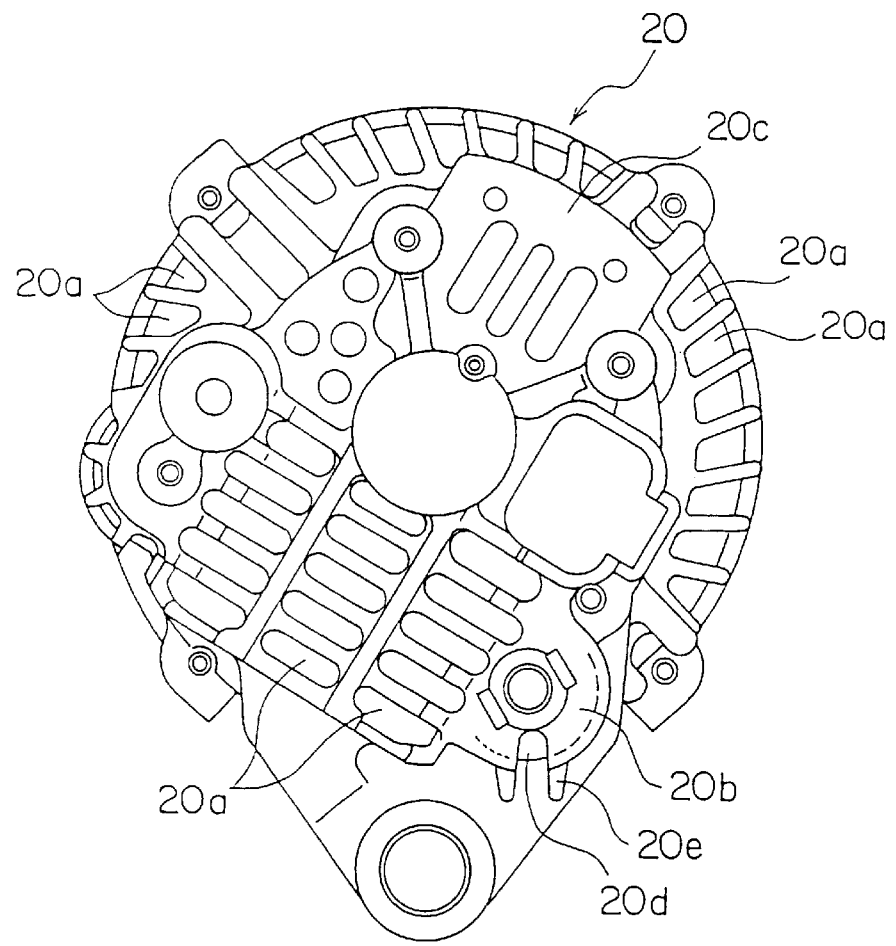
FIG. 1 is a front elevational view showing a rear bracket applied to an alternator according to an embodiment 1 of the present invention.
Figure 2:
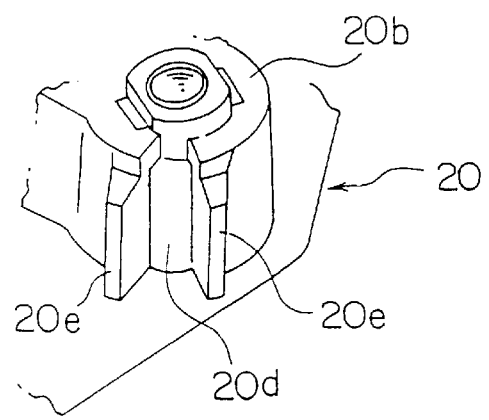
FIG. 2 is a perspective view showing the main portion of the rear bracket applied to the alternator according to the embodiment 1 of the present invention.
Figure 3:
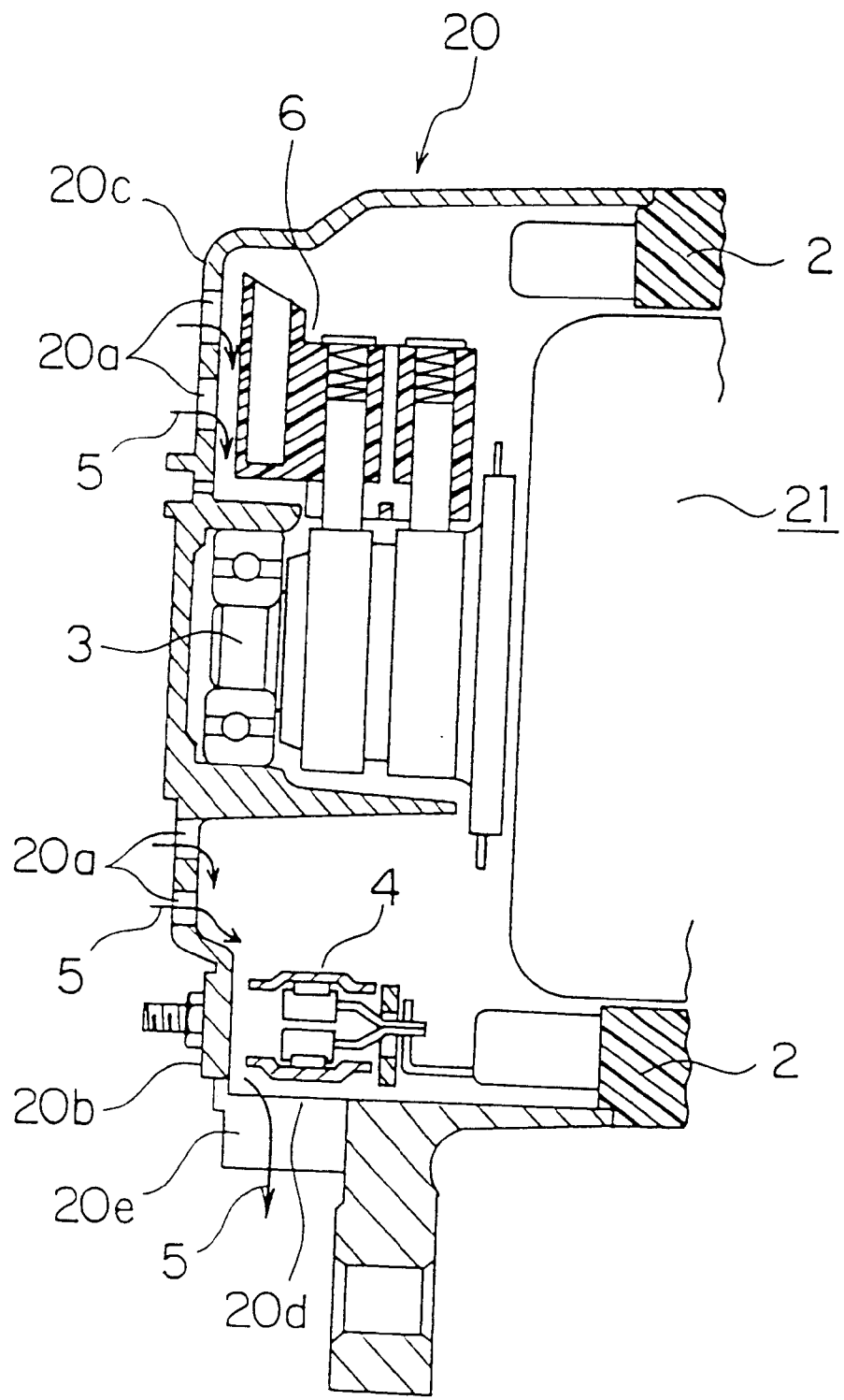
FIG. 3 is a sectional view showing the main portion of the alternator according to an embodiment 1 of the present invention.
Figure 4:
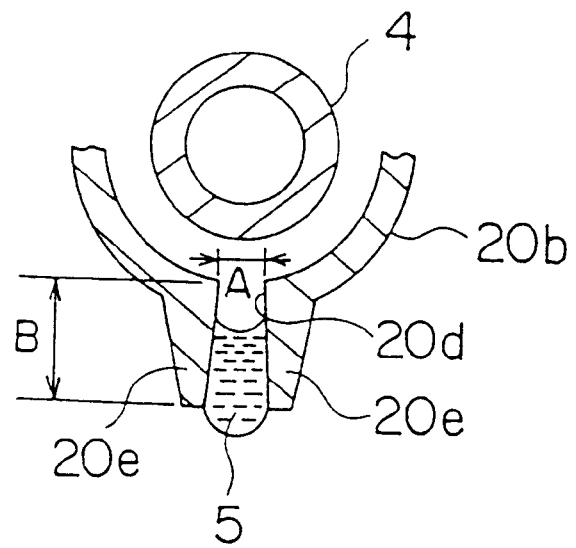
FIG. 4 is a sectional view showing the main portion of the alternator according to the embodiment 1 of the present invention for explaining how water is discharged.

FIG. 1 is a front elevational view showing a rear bracket applied to an alternator according to an embodiment 1 of the present invention, FIG. 2 is a perspective view of the rear bracket when it is viewed from a lower side, FIG. 3 is a sectional view showing the main portion of the alternator according to the embodiment 1 and FIG. 4 is a sectional view of the main portion of the alternator according to the embodiment 1 for explaining how water is discharged.

In FIG. 1 and FIG. 2, a rear bracket 20 has a plurality of vent holes 20a each having a proper size, a terminal mounting portion 20b to which a rectifier is mounted, a brush holder accommodating unit 20c for accommodating a brush holder and the like which are disposed thereto. A water discharge hole 20d is disposed to the side wall surface of the terminal mounting portion 20b. Further, a pair of plate-like guide portions 20e continuously project outward from the opening of the water discharge hole 20d in confrontation with each other so as to enlarge a gap between the guide portions. Note, the width of the opening A of the water discharge hole 20d is set to 1.5 mm and the projecting length of the guide portions 20e is set to 5 mm.

In FIG. 3, the rear bracket 20 is disposed coaxially with a stator core 2 and journals a rotary shaft 3 driven by an engine 11 at the rear end thereof. The rectifier 4 serving as an accommodated component is mounted to the terminal mounting portion 20b of the rear bracket 20. In addition, a brush holder 6 serving as an accommodated component is accommodated in the brush holder accommodating unit 20c.

An alternator 21 arranged as described above is mounted to the engine 11 so that the main surface of the rear bracket 20 faces in a vertical direction. The terminal mounting portion 20b is positioned on a lower side, the opening of the water discharge hole 20d faces downward and the guide portions 20e extend in a ground direction.

When the alternator 21 is splashed with water 5 such as muddy water and the like, the water 5 comes into the alternator 21 through the vent holes 20a. The water 5 having come thereinto flows along the inside wall surface of the rear bracket 20 and reaches the water discharge hole 20d. The water 5 having reached the water discharge hole 20d enters between the pair of guide portions 20e from the water discharge hole 20d by surface tension and stays to the lower portion between the pair of guide portions 20e which the gap therebetween is enlarged toward the ground, as shown in FIG. 4. At the time, since the water 5 stays to the lower portion between the pair of guide portions 20e, there is a sufficient distance between the water 5 and the rectifier 4. Thus, when the amount of water 5 staying between the pair of guide portions 20e increases, its dead lard is more than surface tension generated between the water 5 and the wall surfaces of the guide portions 20e before it comes into contact with the rectifier 4 and then the water 5 drops from between the pair of guide portions 20e.

When the rear bracket 20 was made by variously combining the width of the opening A of the water discharge hole 20d with the projecting length B of the guide portions 20e and how water was discharged was observed, it could be confirmed that the water could be particularly promptly discharged when $B \geq 2A$. It is thinkable that the drain from the guide portions 20e is accelerated because the dead lard of the water staying between the guide portions 20e is more than surface tension generated between the water and the wall surfaces of the guide portions 20e by the relationship between A and B which is set to $B \geq 2A$.

As described above, according to the embodiment 1, when the alternator 21 is mounted to the engine 11, since the water discharge hole 20d is disposed to the side wall surface of the terminal mounting portion 20b facing the ground which is located to the lower side of the rear bracket 20, the pair of guide portions 20e continuously extend from the opening of the water discharge hole 20d downward (in the direction of the ground) so as to enlarge the gap therebetween, and the relationship between the width of the opening A of the water discharge hole and the extending length B of the guide portions is set to $B \geq 2A$, the water 5 having come into the alternator 21 is promptly discharged through the water discharge hole 20d and the pair of guide portions 20e and the water discharge hole 20d is not clogged. As a result, the unacceptable state of the accommodated components such as the rectifier 4 and the like and the occurrence of a voltage drop resulting from the contact of the rear bracket 20 serving as the ground and the accommodated components, which would be caused when the water 5 having come into the alternator 21 stays there without being discharged, can be prevented.

Further, since the pair of the guide portions 20e continuously project outward from the opening of the water discharge hole 20d, the water discharge hole 20d and the pair of guide portions 20e can be molded integrally with the rear bracket 20 by casting. Therefore, the rear bracket 20 having the water discharge hole structure capable of promptly discharging water can be made without the need of special processing.

Embodiment 2

Figure 5:
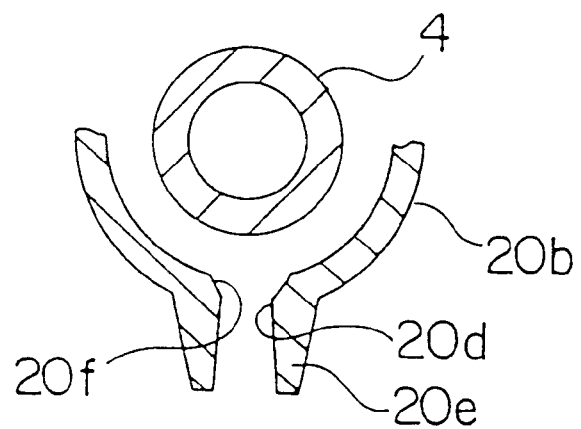
FIG. 5 is a sectional view showing the main portion of a rear bracket applied to the alternator according to an embodiment 2 of the present invention.
Figure 6:
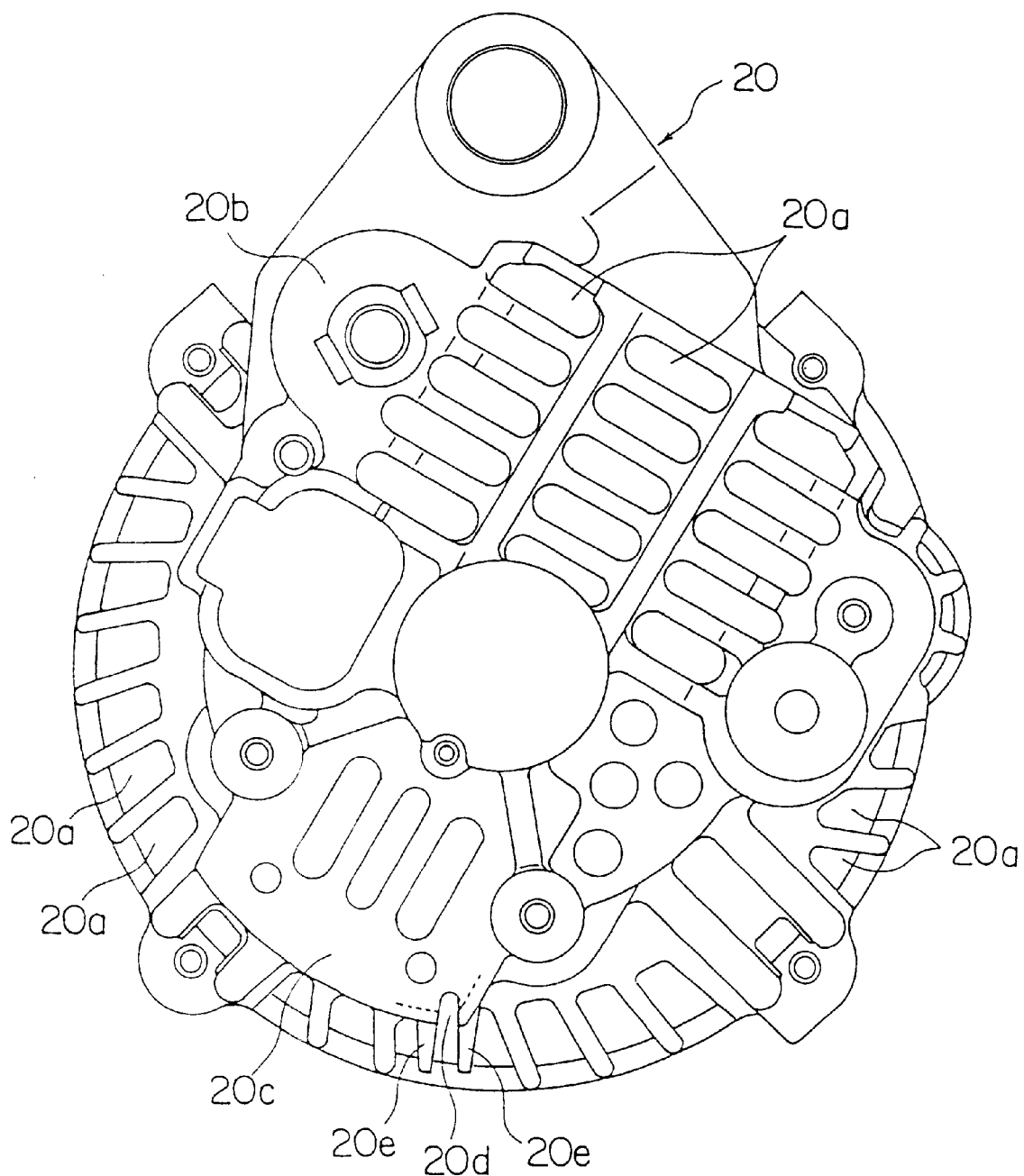
FIG. 6 is a front elevational view showing a rear bracket applied to the alternator according to an embodiment 3 of the present invention.
Figure 7:
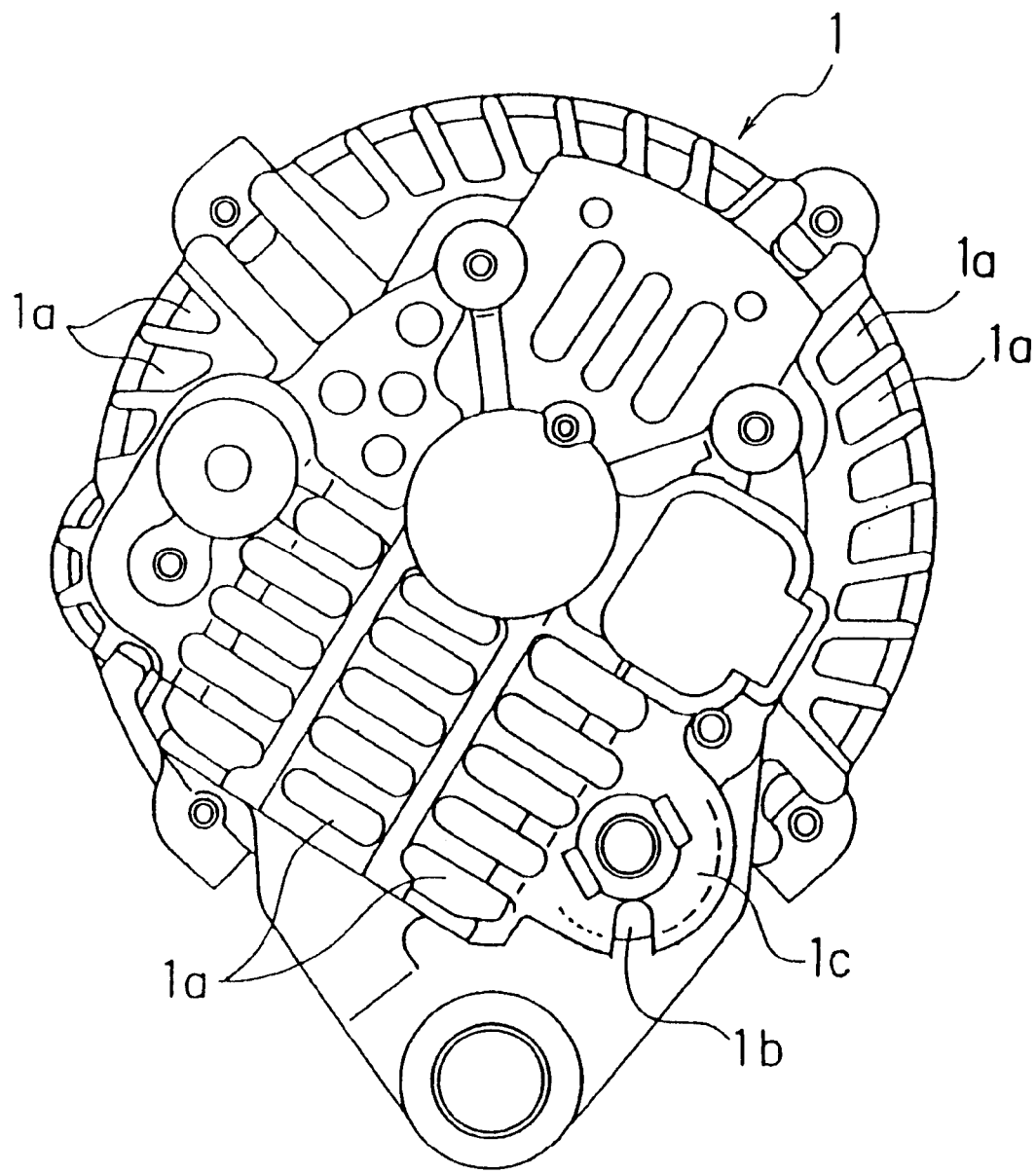
FIG. 7 is a front elevational view showing a rear bracket applied to a conventional alternator.
Figure 8:
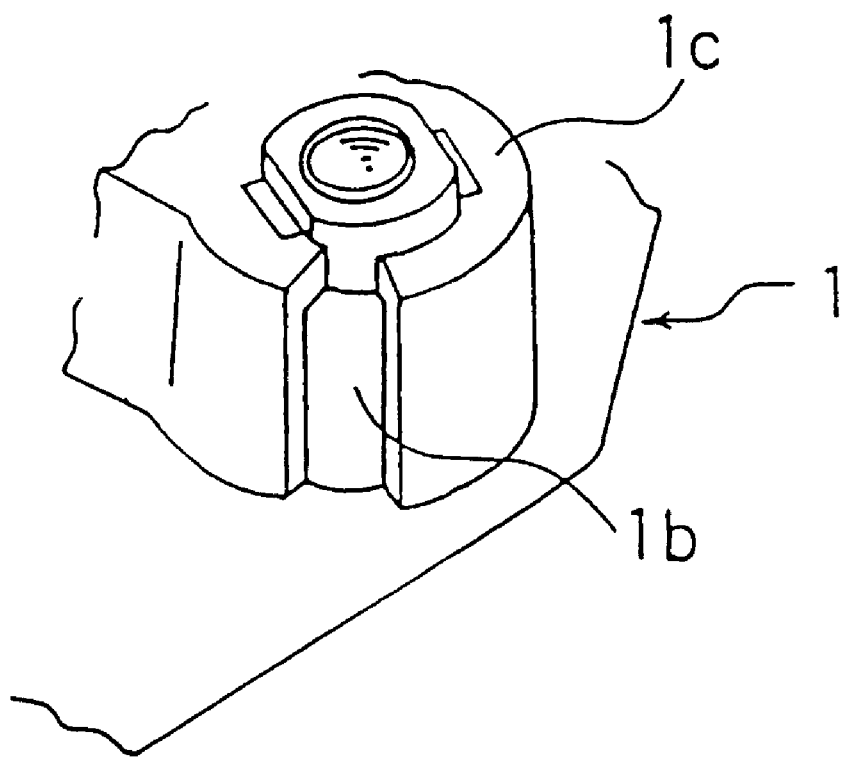
FIG. 8 is a perspective view showing the main portion of the rear bracket applied to the conventional alternator.
Figure 9:
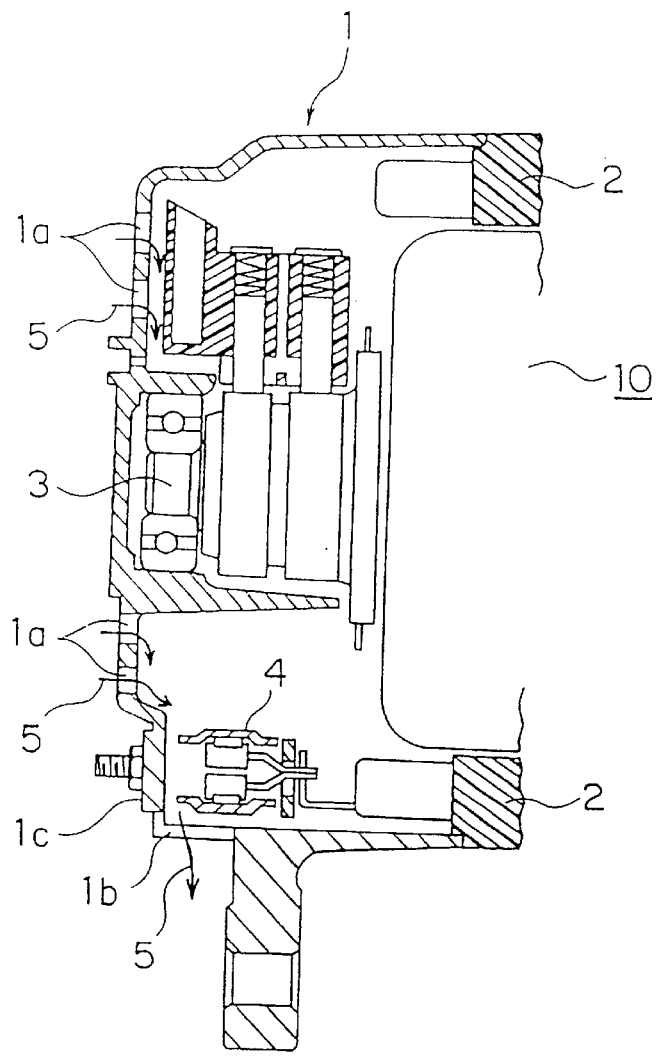
FIG. 9 is a sectional view showing the main portion of the conventional alternator.
Figure 10:
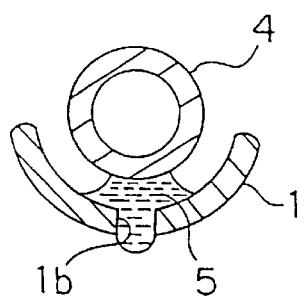
FIG. 10 is a sectional view of the main portion of the conventional alternator for explaining how water is discharged.
Figure 11:
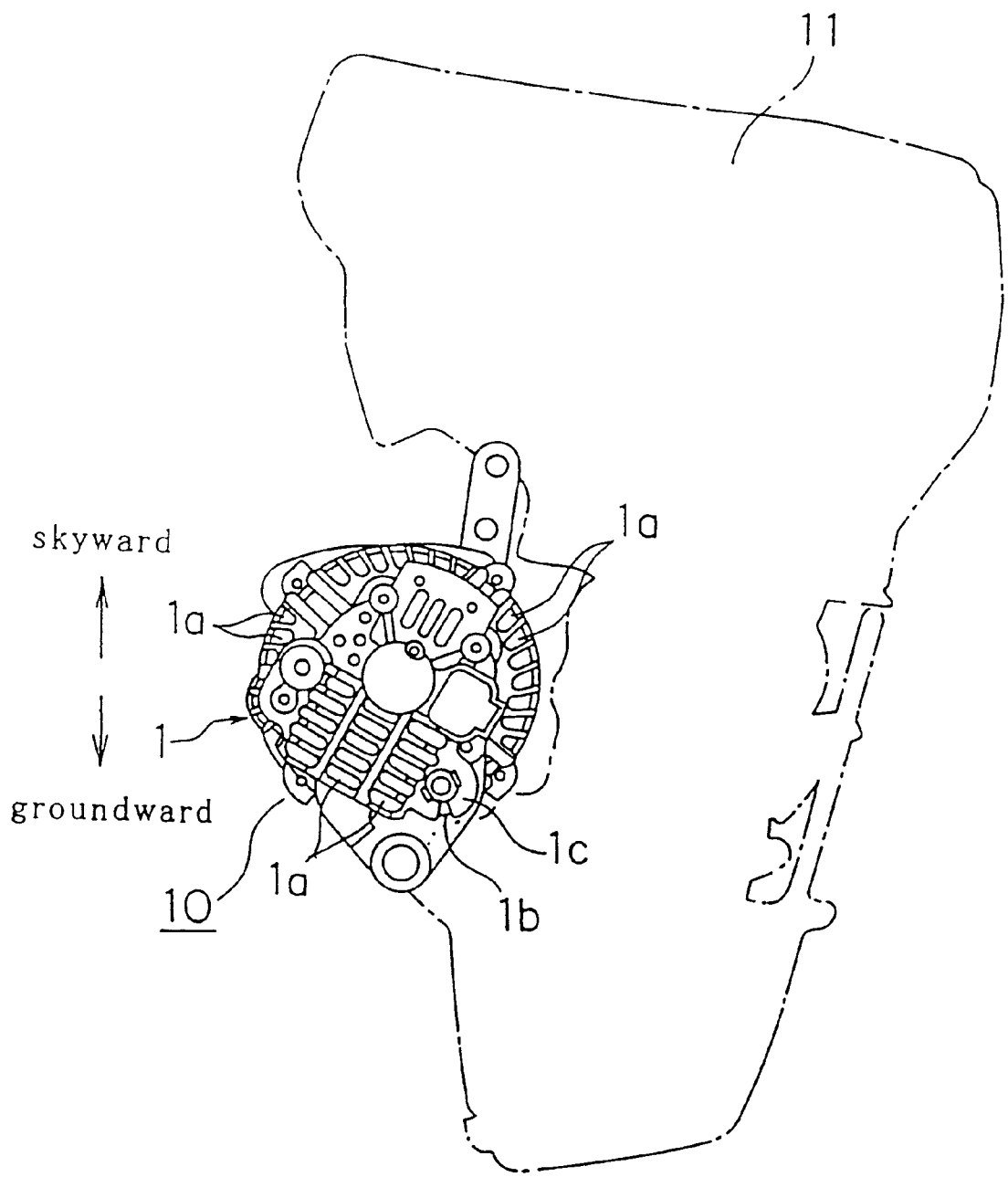
FIG. 11 is a font elevational view showing the state that the conventional alternator is mounted to an engine.

FIG. 5 is a sectional view showing the main portion of a rear bracket applied to the alternator according to an embodiment 2 of the present invention.

The embodiment 2 forms the inner peripheral edge of the opening of a water discharge hole 20d to a taper shape. The other arrangement of the embodiment 2 is the same as that of the embodiment 1.

Water 5 having come into an alternator 21 from a vent holes 20a flows along the inside wall surface of a rear bracket 20 and reaches the water discharge hole 20d. The water 5 having reached the water discharge hole 20d flows between a pair of guide portions 20e from the tapered portion 20f of the opening of the water discharge hole 20d and at the same time enters between a pair of guide portions 20e by surface tension.

Therefore, according to the embodiment 2, since the water 5 having reached the water discharge hole 20d can more easily flows between the guide portions 20e by the tapered shape of the inner peripheral edge of the opening of the water discharge hole 20d, the water does not stay in the vicinity of the water discharge hole 20d, by which a water discharging property can be improved.

Embodiment 3

An embodiment 3 is applied when an alternator 21 is mounted to an engine 11 so that the brush holder accommodating unit 20c of a rear bracket 20 is located to a lower side. Then, a water discharge hole 20d is disposed to the side wall surface, which faces to the ground, of the brush holder accommodating unit 20c and a pair of guide portions 20e continuously extend from the opening of the water discharge hole 20d in the direction of the ground in confrontation with each other.

Therefore, water 5 having entered from vent holes 20a is promptly discharged through the water discharge hole 20d and the pair of guide portions 20e also in the embodiment 3. Thus, the water discharge hole 20d is not clogged and an advantage similar to that of the embodiment 1 can be obtained.

As described above, according to the present invention, the vehicle alternator of the present invention includes a rear bracket which supports a rotary shaft driven by an engine at the rear end thereof, has a plurality of vent holes disposed thereto and is mounted so that the main surface of the rear bracket faces in a vertical direction and the rear bracket includes a water discharge hole bored in a wall surface facing to the ground and a pair of plate-like guide portions continuously extending from the opening of the water discharge hole toward the ground in confrontation with each other so as to enlarge the gap between the guide portions. The relationship between the width of the opening A of the water discharge hole and the extending length B of the guide portions is set to $B \geq 2A$. Accordingly, water having come into the alternator through the vent holes is promptly discharged to the outside through the water discharge hole and the pair of guide portions and the water discharge hole is not clogged. Thus, the unacceptable state of the accommodated components and the occurrence of a voltage drop resulting from the contact of the rear bracket serving as the ground and the accommodated components, which would be caused by the water which comes into the alternator and stays there without being discharged, can be prevented.

Since the water discharge hole is bored in the side wall surface of the terminal mounting portion to which the accommodated components are mounted, the intervals between the accommodated components and the inside wall surface of the rear bracket are narrow and accordingly the water can be promptly discharged from the terminal mounting portion where the water is liable to stay.

Since the rectifier is mounted to the terminal mounting portion, the failure of operation of the rectifier caused when it comes into contact with water can be prevented.

Further, since the inner opening edge of the water discharge hole is formed to the tapered shape, a water discharging property can be more improved.

What is claimed is:

1. A vehicle alternator including a rear bracket which supports a rotary shaft driven by an engine at a rear end of the shaft, the bracket having a plurality of vent holes disposed thereto, and is mounted so that a main surface of the rear bracket faces in a vertical direction with respect to the ground, wherein the rear bracket includes;

a water discharge hole;

a pair of plate-like guide portions continuously extending from an opening in said water discharge hole toward the ground;

wherein the guide portions facing each other so as to enlarge a gap between said guide portions, and;

wherein the relationship between a width of the opening A of the water discharge hole and a length B of the guide portions is set to $B \geq 2A$.

2. A vehicle alternator according to claim 1, wherein an inner opening edge of said water discharge hole is formed to a tapered shape.

* * * * *